(12) United States Patent
Taimela et al.

(10) Patent No.: US 10,862,310 B2
(45) Date of Patent: Dec. 8, 2020

(54) HYBRID POWER GENERATION SYSTEM USING GENERATOR WITH VARIABLE MECHANICAL COUPLING AND METHODS OF OPERATING THE SAME

(71) Applicant: Flexgen Power Systems, Inc., Houston, TX (US)

(72) Inventors: Pasi Taimela, Wake Forest, NC (US); Tony Olivo, Raleigh, NC (US)

(73) Assignee: Flexgen Power Systems, Inc., Durham, NC (US)

( * ) Notice: Subject to any disclaimer, the term of this patent is extended or adjusted under 35 U.S.C. 154(b) by 77 days.

(21) Appl. No.: 16/300,224

(22) PCT Filed: May 8, 2017

(86) PCT No.: PCT/US2017/031529
§ 371 (c)(1),
(2) Date: Nov. 9, 2018

(87) PCT Pub. No.: WO2017/196717
PCT Pub. Date: Nov. 16, 2017

(65) Prior Publication Data
US 2019/0157872 A1 May 23, 2019

Related U.S. Application Data

(60) Provisional application No. 62/333,469, filed on May 9, 2016.

(51) Int. Cl.
*H02J 3/38* (2006.01)
*H02J 3/32* (2006.01)
(Continued)

(52) U.S. Cl.
CPC ............... *H02J 3/381* (2013.01); *H02J 3/24* (2013.01); *H02J 3/28* (2013.01); *H02J 3/32* (2013.01)

(58) Field of Classification Search
CPC ...... H02J 3/381; H02J 3/28; H02J 3/32; H02J 3/24; H02J 2300/10; H02J 2310/10
See application file for complete search history.

(56) References Cited

U.S. PATENT DOCUMENTS 6,670,721 B2 * 12/2003 Lof ..................... F03D 9/255
290/44
9,312,699 B2 * 4/2016 Taimela .................. H02J 3/381
(Continued)

OTHER PUBLICATIONS

International Search Report and the Written Opinion, PCT/US2017/031529, dated Aug. 16, 2017, 13 pages.

*Primary Examiner* — Ramesh B Patel
(74) *Attorney, Agent, or Firm* — Stanek Lemon Crouse & Meeks, P.A.

(57) ABSTRACT

A system includes a generator configured to be electrically coupled to a grid, a transmission configured to mechanically couple the generator to a prime mover, a converter circuit configured to be electrically coupled between the grid and an energy storage device, and a controller configured to control the converter circuit and the transmission. The controller may operate the converter circuit to source or sink power in response to a change on the grid meeting a criterion. The controller may be further configured to adjust a transmission ratio of the transmission based on a demand on the generator. The controller may also be configured to cause the transmission to mechanically decouple the generator from the prime mover while maintaining an electrical coupling of the generator to the grid so that the mechanically decoupled generator can contribute current to a fault on the grid.

15 Claims, 2 Drawing Sheets

(51) Int. Cl.
*H02J 3/24* (2006.01)
*H02J 3/28* (2006.01)

(56) References Cited

U.S. PATENT DOCUMENTS

| | | | | |
|---|---|---|---|---|
| 2002/0087234 | A1* | 7/2002 | Lof | G06Q 40/04 700/286 |
| 2003/0011348 | A1* | 1/2003 | Lof | F03D 9/255 322/37 |
| 2005/0200133 | A1* | 9/2005 | Wobben | H02J 3/40 290/55 |
| 2009/0021080 | A1* | 1/2009 | Loucks | H02J 9/08 307/68 |
| 2010/0270864 | A1* | 10/2010 | Vyas | H02J 7/35 307/82 |
| 2014/0159365 | A1* | 6/2014 | Algrain | H02J 3/32 290/7 |
| 2014/0316593 | A1* | 10/2014 | Taimela | H02J 3/24 700/287 |
| 2015/0123623 | A1* | 5/2015 | Gulen | H02P 9/14 322/20 |
| 2019/0214827 | A1* | 7/2019 | Johnson, Jr. | H02J 3/28 |

* cited by examiner

HYBRID POWER GENERATION SYSTEM USING GENERATOR WITH VARIABLE MECHANICAL COUPLING AND METHODS OF OPERATING THE SAME

RELATED APPLICATIONS

The present application is a 35 U.S.C. § 371 national phase application of PCT International Application No. PCT/US2017/031529, having an international filing date of May 8, 2017, and claiming priority to U.S. Provisional Application No. 62/333,469, filed May 9, 2016, the disclosures of which are incorporated herein by reference in their entireties. The above PCT International Application was published as International Publication No. WO 2017/196717 A1.

BACKGROUND

The present inventive matter generally relates to power systems and methods of operating same and more particularly, to power systems driven by generators and methods of operating same.

In island grid applications, generation assets, such as diesel or gas powered generators and turbines, may experience transient load conditions that can cause changes in grid frequency and voltage. These transient conditions may include, for example, large load changes and sudden changes in power source availability, such as a generation asset shutting down or becoming unavailable or a fault on one or more phases of the grid. Such variations in line frequency or voltage may result in dropped loads or damaged equipment.

Some island grids may be supported by one generation asset sized to support the peak load and to respond to large transient load steps. These assets may operate at very high utilization rates, for example, 24 hours a day, 7 days a week, 365 days a year, but at relatively low real load factors, e.g., between 15-50%, for extended periods of off-peak time. U.S. Pat. No. 9,312,699 to Taimela et al, assigned to the assignee of the present application, describes use of a generator in combination with an electronic converter-based Solid State Generator (SSG) used to support operation of the generator using energy from an energy storage device, such as a battery or capacitor bank. The SSG may be used to provide transient load support and to provide power to the grid when the generator is inactive.

When a synchronous generator is connected to the grid, the fault clearing capability is substantial due to the stored energy in the rotating mass of the generator. An electronic device, such as the SSG described above, couples energy storage to the grid by use of power electronics, such as a DC/AC converter, allowing it to supplement or replace generating assets. Although the SSG's power electronics may provide load step transient support, the peak current output capability of such a device may be more limited than that of a rotating generator.

Island grid applications may also have renewable/variable assets, such as wind and solar generation in combination with the traditional generating assets, such as diesel or gas powered generators and turbines. It is common that these variable generation assets are also connected to the grid via power electronics rather than synchronous machines. In such applications, responses to disturbances may be determined by control functions of the power electronics and not the inherent electromechanical dynamics of synchronous machines. When an island grid is supported with such assets rather than synchronous machines, the grid may be less robust and more vulnerable to fault currents.

SUMMARY OF THE INVENTION

According to some embodiments, a system includes a generator configured to be electrically coupled to a grid, a transmission configured to mechanically couple the generator to a prime mover, a converter circuit configured to be electrically coupled between the grid and an energy storage device, and a controller configured to control the converter circuit and the transmission. In some embodiments, the controller may be configured to cause the transmission to couple the prime mover to the generator to provide power to the grid and to operate the converter circuit to source or sink power in response to a change on the grid meeting a criterion. In further embodiments, the controller may be further configured to adjust a transmission ratio of the transmission based on a demand on the generator. In some embodiments, the controller may be configured to cause the transmission to mechanically decouple the generator from the prime mover while maintaining an electrical coupling of the generator to the grid so that the mechanically decoupled generator can contribute current to a fault on the grid.

Further embodiments provide a system including a generator configured to be electrically coupled to a grid, a variable ratio transmission configured to mechanically couple the generator to a prime mover, a converter circuit configured to be coupled between the grid and an energy storage device, and a controller configured to operate the converter circuit to source or sink power in response to a change on the grid (e.g., a frequency variation caused by a step change in demand) meeting a criterion. The controller may be further configured to adjust a transmission ratio of the transmission responsive to a demand on the generator.

Some embodiments provide methods including mechanically coupling a prime mover to a generator to provide power to a grid, operating a converter circuit electrically coupled to the grid to source or sink power in response to a change on the grid meeting a criterion, mechanically decoupling the generator from the prime mover while maintaining an electrical coupling of the generator to the grid while providing power to the grid from the converter circuit, and providing current from the mechanically decoupled generator to the grid in response to a fault on the grid. The methods may further include varying a transmission ratio between the prime mover and the generator responsive to a demand on the generator.

Still further embodiments provide methods including mechanically coupling a prime mover to a generator to provide power to a grid, varying a transmission ratio of the coupling between the prime mover and the generator responsive to a demand on the generator, and operating a converter circuit electrically coupled to the grid to source or sink power in response to a change on the grid meeting a criterion. The methods may further include mechanically decoupling the generator from the prime mover while maintaining an electrical coupling of the generator to the grid while providing power to the grid from the converter circuit, and providing current from the mechanically decoupled generator to the grid in response to a fault on the grid.

DETAILED DESCRIPTION

Figure 1:
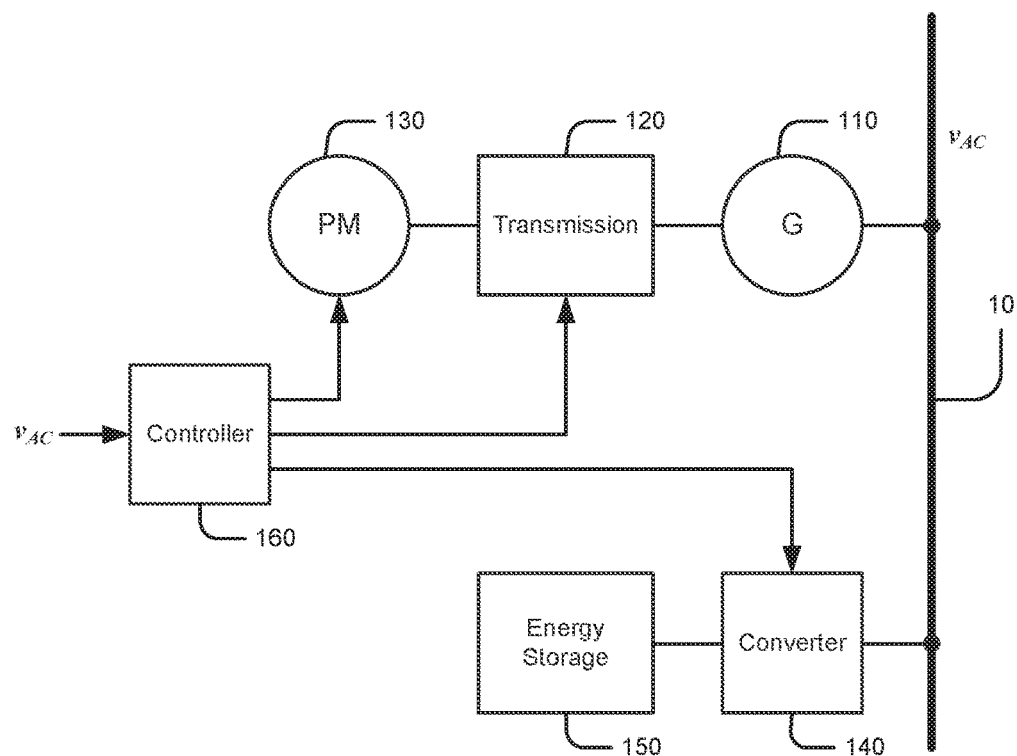
FIG. 1 is a schematic diagram illustrating a power system according to some embodiments of the inventive subject matter.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like items. It will be understood that when an item is referred to as being "connected" or "coupled" to another item, it can be directly connected or coupled to the other item or intervening items may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, items, and/or components, but do not preclude the presence or addition of one or more other features, integers, steps, operations, items, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

As discussed above, in island grid applications in which a large percentage of the generation assets are connected to the grid with power electronics, the ability to rapidly isolate a fault on one branch of the grid may be limited. For example, a typical circuit breaker will trip in 10 seconds with 2 times rated current, 1 second with 5 times rated current and within 1 cycle with 10-20 times rated current. By providing high fault currents from power sources, the breakers and other protective elements may operate in their minimum time and the faulted branch of the grid may be quickly isolated. Since most modern equipment is generally tolerant of brief power outages of a cycle or less, the remaining loads on the grid can continue to operate normally after the event. This makes it clear that providing substantial fault currents are instrumental in maintaining a healthy and robust grid.

The importance of fault current can be understood by considering a case in which the grid is supported by one or more synchronous generators and a case in which the grid is supported by one or more generation assets connected to the grid with power converters. In the case where the grid is supported by one or more synchronous generators, during grid faults, the synchronous generator will provide substantial current limited by the system impedance. Synchronous generators are rotating magnetic structures composed of iron and copper. When operating at synchronous speeds, the synchronous generator has substantial stored energy by virtue of the spinning rotor and magnetic field. A synchronous generator typically has no power electronics to protect or fail during fault conditions. During the sub-transient period, the first AC line cycle or so after the fault, one can expect the fault current to be at least 10 to 20 times rated current of the synchronous generator. Since this fault current can be achieved without any power electronics, it generally is unnecessary to limit or protect the synchronous generator during these short intervals. In the event of a fault on the grid, the synchronous generators can therefore provide substantial fault clearing currents and frequency stability to the grid. This high current capability can ensure that breakers operate quickly and isolate the load from the grid so that remainder of the loads can maintain operation.

In the case where the grid is supported by generating assets that are connected to the grid with power converters, however, the response to fault disturbances may be constrained by control functions and/or protective circuits for the semiconductors of the converters, which may prevent over currents that can cause failure. For these short duration fault currents, the power electronics might supply 2-3 times rated current. For power electronics to mimic the inherent fault current response of a synchronous generator, dramatically oversized semiconductor devices may be needed, which may have an adverse effect on size, weight, cost and efficiency.

FIG. 1 illustrates a system according to some embodiments. The system includes a generator 110 configured to be coupled to a grid 10. The generator 110 is mechanically coupled to a prime mover 130 (e.g., a standard synchronous engine) by a transmission 120. The generator 110 may be a standard synchronous generator with an excitation controller and the prime mover 130 may be a standard synchronous engine with a constant speed control, as typically found in conventional engine/generator sets. The transmission 120 includes a clutch or other mechanism for mechanically decoupling and coupling the prime mover 130 to and from the generator 110, and may further include other components for mechanical power transmission, such as a gear train, fluid couplings, and the like.

The system further includes a converter circuit 140 (e.g., a DC/AC converter) configured to be coupled to the grid 10 and to support transfer of power between an energy storage device 150 (e.g., a battery or capacitor bank) and the grid 10. A controller 160 controls the transmission 120 and the converter 140.

The converter circuit 140 may include an inverter, along with other power processing circuitry, such as boost or buck converter circuit. The controller 160 may monitor state of charge, voltage, temperature and other characteristics of the energy storage device 150. The controller 160 may control the converter circuit 140 to provide load support for step changes in load or supply on the grid 10. For example, the controller 160 may respond to frequency deviations in a voltage $v_{AC}$ of the grid 10, in manner similar to that described in the aforementioned U.S. Pat. No. 9,312,699 to Taimela et al, the disclosure of which is incorporated herein by reference in its entirety. Depending on the specific application, the energy storage device 150 may include electrochemical storage, such as lithium-ion batteries and/or ultracapacitors (electro-chemical double layer capacitors) and/or other types of storage systems, such as a flywheel-based or compressed air based storage system.

In a first mode of operation, the grid is supported by the prime mover 130 coupled to the generator 110 via the transmission 120 (e.g., a clutch of the transmission 120 is engaged). As noted above, in this mode, the controller 160 may cause the converter circuit 140 to selectively use the energy storage device 150 as a transient energy source and/or sink for the grid 10 to compensate for load and/or source step changes. The magnitude of the transients may be limited by the current handling capably of the semiconductors in the converter circuit 140.

In a second mode of operation, the controller 160 may cause the converter circuit 140 to provide power to the grid 10 from the energy storage unit 150 while the prime mover 130 is decoupled from the generator 110 by the transmission 120 (e.g., a clutch of the transmission 120 is disengaged) and the prime mover 130 is deactivated to save fuel. The generator 110 remains connected to the grid but is mechanically isolated/decoupled from the prime mover 130 so that the generator 110 can be operated as a motor operating at synchronous speed. This enables the generator 110 to be used as a source for additional fault current in response to a fault on the grid 10. This configuration can also be used in combination with other generation assets (not shown), such as photovoltaic arrays, that are coupled to the grid 10 via power electronics. After the energy storage device 150 is depleted to a certain level, the prime mover 130 can be activated and reconnected to the generator 110 by the transmission 120. After the generator 110 assumes the load, the controller 160 can cause the converter circuit 140 to recharge the energy storage device 150.

In the second mode, when a grid fault is encountered, the decoupled generator 110 can supply substantial fault current (e.g., 10 to 20 times the full load current) and the converter circuit 140 can provide additional current capability to aid in fault clearing. Since the response of a circuit breaker to an over current condition is generally related to the magnitude of the over current with respect to the breaker rating, increased fault currents can reduce breaker opening intervals. By minimizing breaker opening intervals, the chance of the remaining loads continuing operation after the fault event can be improved.

Figure 2:
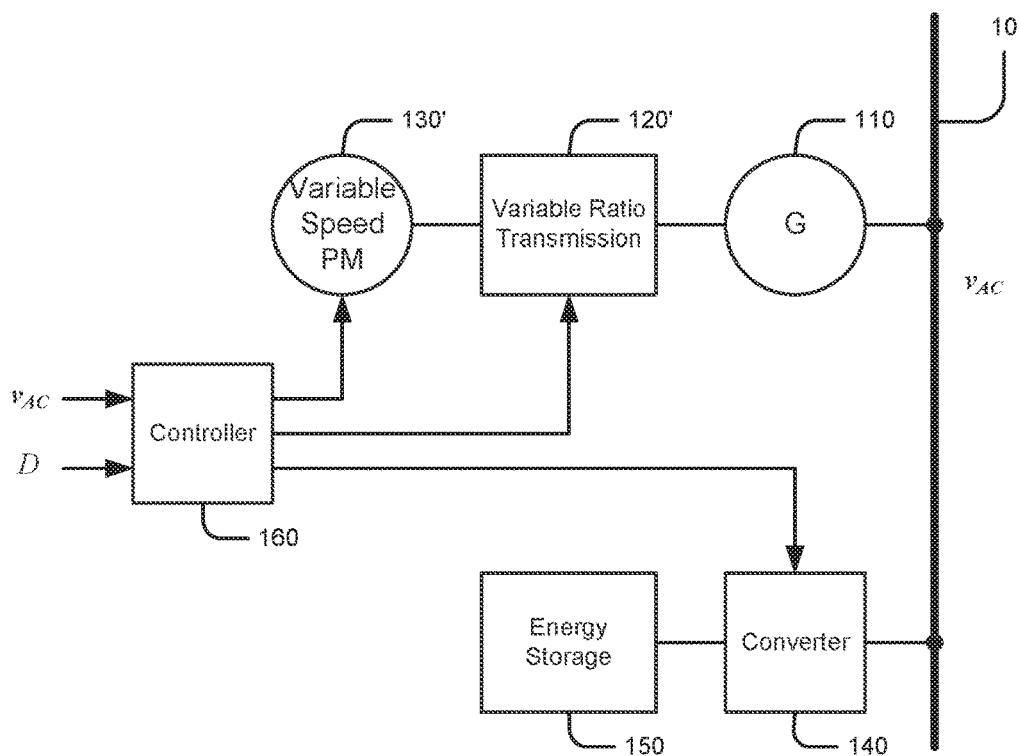
FIG. 2 is a schematic diagram illustrating a power system using a variable speed prime mover and variable ratio transmission according to further embodiments of the inventive subject matter.

In further embodiments illustrated in FIG. 2, a variable ratio transmission 120' may be used to enable the speed of a prime mover 130' to be changed based on the demand on the generator 110, thus allowing the prime mover 130' to be operated at lower speeds when demand is low to improve fuel economy. According to some embodiments, the prime mover 130' may be a variable speed industrial engine with an engine control unit (ECU) capable of varying engine speed, and the variable ratio transmission 120' may be, for example, a clutched transmission with gearing that provides a set of selectable discrete transmission ratios or a continuously variable transmission (CVT) that provides a continuously variable transmission ratio. The transmission 120' and prime mover 130' may be controlled to operate at a fuel-efficient operating point (e.g., an optimal combination of engine speed and transmission ratio) based on a measure D of demand on the generator 110. This arrangement may be operated in manner similar to that described above with reference to FIG. 1. In particular, the controller 160 may cause the converter circuit 140 to provide power to the grid 10 from the energy storage unit 150 while the prime mover 130' is decoupled from the generator 110 by the transmission 120', and the decoupled generator 110 may be used to provide additional fault current when needed.

It will be appreciated that in such an arrangement, the generator 110 may be a standard synchronous generator, rather than, for example, a variable speed generator with permanent magnets, like ones commonly used with wind turbines. The fault clearing energy storage of magnetic field and rotor of the generator 110 can remain the same irrespective of the state of the prime mover 130'.

In moving between these different modes of operation, it may be necessary to re-synchronize the transmission 120' to the generator 110 before enabling the clutch of the transmission 120' to couple the prime mover 130' to the generator 110. In further embodiments, starting of the prime mover 130' may be accomplished by engaging the transmission 120' at an appropriate gear ratio that allows the generator 110 to drive the prime mover 130' and thus act as a starter motor. This may serve as a backup for a traditional lead-acid battery and starting motor for the prime mover 130'.

Figure 3:
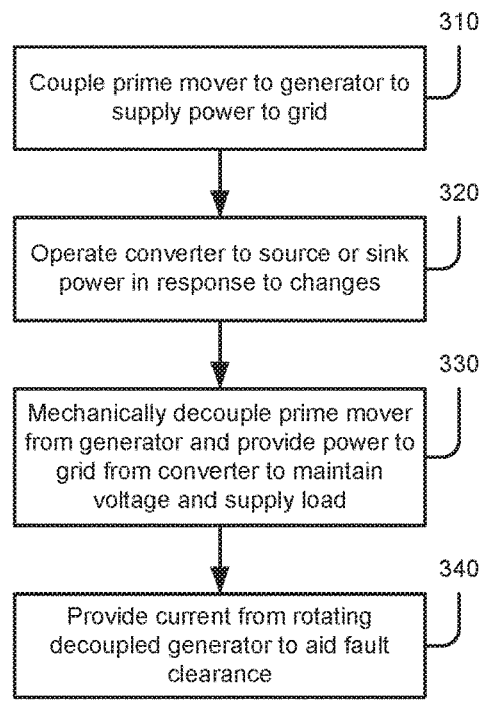
FIGS. 3 and 4 are flowcharts illustrating examples of operations of power systems according to further embodiments of the inventive subject matter.

FIG. 3 is a flowchart illustrating operations of a power supply system along the lines described above according to further embodiments of the inventive subject matter. A prime mover is coupled to a generator to supply power to a grid (block 310). A converter coupled to the grid is operated to support the generator in meeting step changes in demand (block 320). Subsequently, the prime mover is mechanically decoupled from the generator, which remains electrically coupled to the grid while the converter provides power to maintain a voltage on the grid and supply demand, such that the generator now acts as a motor (block 330). In response to a fault on the grid, the mechanically decoupled generator can provide current to aid in fault clearance (block 340).

Figure 4:
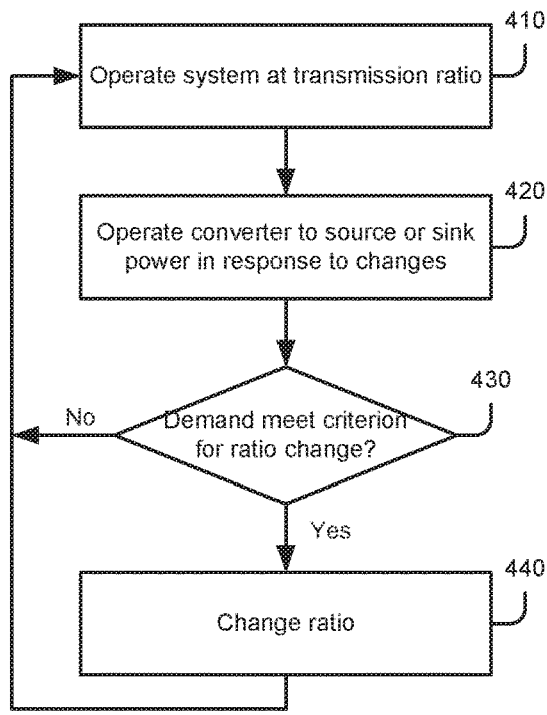

FIG. 4 illustrates operations of a power supply system according to further embodiments. A system, such as the system of FIG. 2, provides power to a grid from a generator that is linked to a prime mover by a variable ratio transmission that is set at a given transmission ratio (block 410). In this state, a power converter coupled to the grid provides transient power to aid the generator in meeting step changes in demand (block 420). When a demand on the generator changes to the point that it meets a particular criterion necessitating a change in the transmission ratio (block 430), the ratio is changed to meet the new demand (block 440). For example, the transmission may provide discrete ratio changes, and the criterion may comprise a measure of the demand falling outside of a window that is optimal for a given transmission ratio. The decision to change ratio may be time-conditioned (e.g., the measure of demand may be time-averaged) to reduce the likelihood of excessive changes due to relative short-term load changes.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

What is claimed:

1. A system comprising:
   a generator electrically coupled to a grid;
   a transmission that mechanically couples the generator to a prime mover;
   a converter circuit electrically coupled between the grid and an energy storage device; and
   a controller that controls the converter circuit and the transmission.

2. The system of claim 1, wherein the controller is configured to cause the transmission to couple the prime mover to the generator to provide power to the grid and to operate the converter circuit to source or sink power in response to a change on the grid meeting a criterion.

3. The system of claim 2, wherein the controller is further configured to adjust a transmission ratio of the transmission based on a demand on the generator.

4. The system of claim 2, wherein the controller senses a frequency of a voltage of the grid and detects the change on the grid responsive to the sensed frequency.

5. The system of claim 2, wherein the controller is further configured to cause the transmission to mechanically decouple the generator from the prime mover while maintaining an electrical coupling of the generator to the grid so that the mechanically decoupled generator can contribute current to a fault on the grid.

6. The system of claim 1, wherein the controller is configured to cause the transmission to mechanically decouple the generator from the prime mover while maintaining an electrical coupling of the generator to the grid so that the mechanically decoupled generator can contribute current to a fault on the grid.

7. A system comprising:
a generator electrically coupled to a grid;
a variable ratio transmission that mechanically couples the generator to a prime mover;
a converter circuit electrically coupled between the grid and an energy storage device; and
a controller that operates the converter circuit to source or sink power in response to a change on the grid meeting a criterion.

8. The system of claim 7, wherein the controller is further configured to adjust a transmission ratio of the transmission responsive to a demand on the generator.

9. The system of claim 7, wherein the controller is senses a frequency of a voltage of the grid and detects the change on the grid responsive to the sensed frequency.

10. A method comprising:
mechanically coupling a prime mover to a generator to provide power to a grid;
operating a converter circuit electrically coupled to the grid to source or sink power in response to a change on the grid meeting a criterion;
mechanically decoupling the generator from the prime mover while maintaining an electrical coupling of the generator to the grid while providing power to the grid from the converter circuit; and
providing current from the mechanically decoupled generator to the grid in response to a fault on the grid.

11. The method of claim 10, wherein operating a converter circuit electrically coupled to the grid to source or sink power in response to a change on the grid meeting a criterion comprises:
sensing a frequency of a voltage of the grid; and
detecting the change on the grid responsive to the sensed frequency.

12. The method of claim 10, further comprising varying a transmission ratio between the prime mover and the generator responsive to a demand on the generator.

13. A method comprising:
mechanically coupling a prime mover to a generator to provide power to a grid;
varying a transmission ratio of the coupling between the prime mover and the generator responsive to a demand on the generator; and
operating a converter circuit electrically coupled to the grid to source or sink power in response to a change on the grid meeting a criterion.

14. The method of claim 13, further comprising:
mechanically decoupling the generator from the prime mover while maintaining an electrical coupling of the generator to the grid while providing power to the grid from the converter circuit; and
providing current from the mechanically decoupled generator to the grid in response to a fault on the grid.

15. The method of claim 13, wherein operating a converter circuit electrically coupled to the grid to source or sink power in response to a change on the grid meeting a criterion comprises:
sensing a frequency of a voltage of the grid; and
detecting the change on the grid responsive to the sensed frequency.

* * * * *